(12) United States Patent
Onodera et al.

(10) Patent No.: US 7,331,055 B2
(45) Date of Patent: Feb. 12, 2008

(54) INFORMATION RECORDING AND REPRODUCING MEDIUM WITH AREAS FOR RECORDING INFORMATION OPTICALLY ON ONE SIDE AND RECORDING VISUAL INFORMATION ON ANOTHER SIDE

(75) Inventors: Keiichi Onodera, Tokyo (JP); Hiroyuki Kurashina, Saitama-ken (JP); Takeshi Takahashi, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 212 days.

(21) Appl. No.: 09/819,721

(22) Filed: Mar. 29, 2001

(65) Prior Publication Data

US 2001/0026531 A1 Oct. 4, 2001

(30) Foreign Application Priority Data

Mar. 31, 2000 (JP) .............................. 2000-098927

(51) Int. Cl.
*G11B 7/24* (2006.01)
(52) U.S. Cl. ...................................................... 720/718
(58) Field of Classification Search ................. 369/284
See application file for complete search history.

(56) References Cited

U.S. PATENT DOCUMENTS

| 4,711,996 | A |   | 12/1987 | Drexler ........................ 235/468 |
| 4,915,997 | A | * | 4/1990  | Yamamuro et al. ......... 428/65.2 |
| 4,931,337 | A | * | 6/1990  | Miyazaki et al. ........... 428/64.8 |
| 4,967,286 | A |   | 10/1990 | Nomula et al. |
| 5,138,604 | A | * | 8/1992  | Umeda et al. ............... 369/103 |
| 5,509,991 | A |   | 4/1996  | Choi ............................ 156/245 |
| 5,675,570 | A | * | 10/1997 | Ohira et al. ................. 369/275.1 |
| 5,729,533 | A | * | 3/1998  | Marquardt ................... 369/273 |
| 5,737,306 | A |   | 4/1998  | Ito et al. |
| 5,748,607 | A | * | 5/1998  | Ohira et al. ................. 369/275.4 |
| 5,751,671 | A | * | 5/1998  | Koike et al. .................... 369/14 |
| 5,809,003 | A | * | 9/1998  | Taira et al. ................. 369/275.1 |
| 5,875,156 | A |   | 2/1999  | Ito et al. |
| 5,967,676 | A |   | 10/1999 | Cutler et al. |
| 6,088,323 | A |   | 7/2000  | Kobayashi et al. |
| 6,226,109 | B1 | * | 5/2001 | Tompkin et al. ................ 359/2 |

(Continued)

FOREIGN PATENT DOCUMENTS

| EP | 0 762 407 A2 | 9/1996 |
| EP | 0 840 307 A2 | 5/1998 |
| JP | 59190895 A * | 10/1984 |

(Continued)

*Primary Examiner*—David Davis
(74) *Attorney, Agent, or Firm*—Arent Fox PLLC

(57) ABSTRACT

A program area for the normal writing of information is provided on a first side of an information recording and reproducing medium, and a label area and a program area on which information can be written are provided on the opposing second side of the medium. A bibliographic description such as the name or trademark or the like of the company who manufactured the disc is recorded in the label area using printing or the like. A recording layer of a cyanine or an azo based organic dye is provided in the program area, and an image pattern is recorded optically onto this recording layer. With such a construction, a user can form a visible pattern known as pit art on the recording layer of the program area by optically writing a desired image pattern, and as a result can readily identify and organize a plurality of information recording and reproducing media.

19 Claims, 12 Drawing Sheets

U.S. PATENT DOCUMENTS

| | | |
|---|---|---|
| 6,392,964 B2 | 5/2002 | Koyata et al. |
| 6,507,557 B1 * | 1/2003 | Ohno et al. .............. 369/275.3 |
| 6,556,234 B1 | 4/2003 | Koyama |
| 6,754,158 B1 | 6/2004 | Kobayashi et al. |
| 2003/0108708 A1 * | 6/2003 | Anderson et al. .......... 428/64.4 |

FOREIGN PATENT DOCUMENTS

| | | | |
|---|---|---|---|
| JP | 59215892 A | * | 12/1984 |
| JP | 09306144 A | * | 11/1997 |
| JP | 10320963 A | * | 12/1998 |

\* cited by examiner

INFORMATION RECORDING AND REPRODUCING MEDIUM WITH AREAS FOR RECORDING INFORMATION OPTICALLY ON ONE SIDE AND RECORDING VISUAL INFORMATION ON ANOTHER SIDE

BACKGROUND OF THE INVENTION

The present invention relates to an information recording and reproducing medium for optically recording and reproducing information.

CD (Compact Disc) and DVD (Digital Video Disc or Digital Versatile Disc) are examples of conventional information recording and reproducing media used for carrying out recording of information or reproducing of information optically. Furthermore, research and development is continuing on CD and DVD media capable of recording information, such as write once discs and re-writable discs in which information can only be written to one side of the disc, as well as write once discs and re-writable discs in which information can be written on both sides of the disc.

In the aforementioned write once discs and re-writable discs in which information can only be written to one side of the disc, the opposite side of the disc to that on which information writing and information reading occurs (hereafter referred to as the recording and reproducing surface) is known as a label surface, and the name or a trademark or the like of the company who manufactured the disc is printed on this label surface.

In the case of write once discs and re-writable discs in which information can be written on both sides of the disc, the above type of label surface does not exist, and both surfaces are recording and reproducing surfaces.

As a result of research and development, a wide range of uses have appeared for these type of write once discs and re-writable discs, and provided they conform with copyright regulations, users are able to create original discs by recording their own selections of music or images as disc content, or create discs which offer greater convenience by writing the computer program data needed for combining all their essential applications onto a single disc.

However, the different discs described above are of an extremely similar shape and appearance, and as the number of discs being used increases, users are finding it increasingly difficult to choose the desired disc from amongst a large number of discs, or to organize their disc collections.

Consequently, users have adopted a method of using a writing instrument or the like to handwrite some type of identifying text or design onto the blank portions of the aforementioned label surface provided on those write once discs and re-writable discs in which only one side functions as a recording and reproducing surface. Each disc is subsequently identified, and the disc collection is organized, based on the handwritten markings.

However, there are problems associated with handwriting text or designs onto the label surface, such as the text or design gradually fading and becoming indistinct, and the general loss in aesthetic appeal of the disc issuing.

Furthermore, in write once discs and re-writable discs in which both surfaces function as recording and reproducing surfaces, no label surface exists, and so even handwriting text or a design is impossible, making the organization extremely difficult.

In addition, in the case of write once discs and re-writable discs in which both sides functions as recording and reproducing surfaces, a problem arises in that it is difficult to ascertain which recording and reproducing surface contains the necessary information.

SUMMARY OF THE INVENTION

The present invention aims to overcome these conventional problems, and an object of the present invention is to provide an information recording and reproducing medium comprising an area for recording visual information.

An information recording and reproducing medium of the present invention is an information recording and reproducing medium in which information can be written optically to both sides of the medium, comprises a label area and a program area onto which information can be written optically, wherein the both areas are provided on at least one of the two sides. Furthermore, the aforementioned program area has a ring shape of a predetermined width. Also, a pit art is recorded in the program area. Furthermore, the program area is provided with a recording layer made of an organic dye such as a cyanine based organic dye or an azo based organic dye, the optical characteristics of which vary upon irradiation with light.

According to an information recording and reproducing medium of this type of construction, by optically writing an image pattern onto the program area provided on one side of the disc, a visible pattern known as pit art can be recorded. As a result, it becomes possible to record pit art which displays text or a design or the like, as well as identify and organize a plurality of information recording and reproducing media. Furthermore, because the pit art is recorded optically, it is possible to totally prevent the conventional problems associated with the gradual fading of handwriting or the loss of aesthetic appearance.

Furthermore, by making the program area a ring shape, the pit art can be recorded using a conventional writing device capable of writing information.

In addition, an information recording and reproducing medium in which information can be written optically onto both sides thereof, comprises a normal information recording surface on one of said both sides, and a pit art recording surface on an opposing side thereof, wherein the opposing side comprises a recording layer formed from a material with a large difference in optical characteristics between written sections and non-written sections produced when information is written optically onto the recording layer.

Because of forming the recording layer of the program area from a cyanine or an azo based organic dye, the pit art of good visibility can be recorded.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
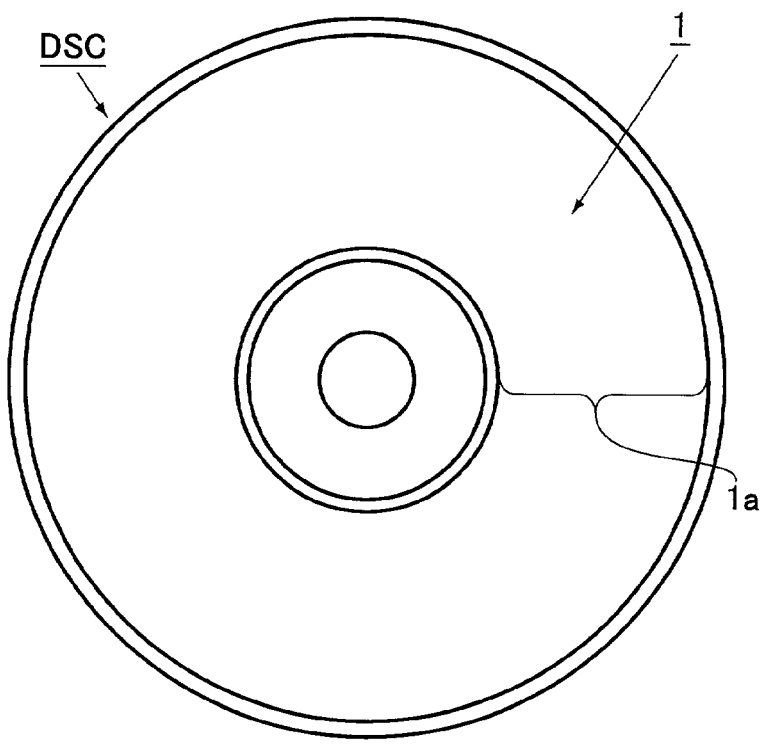
FIGS. 1(a) and 1(b) are plan views showing the construction of a write once disc of an embodiment of the present invention.
Figure 1:
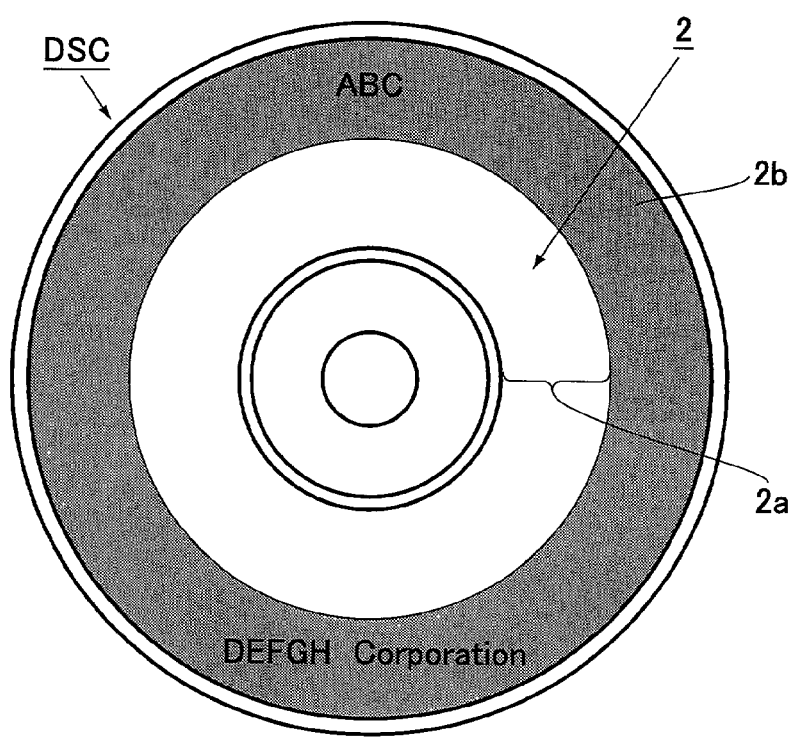

Embodiments of the present invention will be described below with reference to the accompanying drawings. Moreover, a CD-R disc in which information can be written on both sides thereof is described as the preferred embodiment.

FIGS. 1(a) and 1(b) are plan views showing the external appearance of a write once disc DSC of the preferred embodiment. FIG. 1(a) shows the configuration of a side 1 of the write once disc DSC, and FIG. 1(b) shows the configuration of the other side 2 (corresponding with the opposite side to the side 1).

On one side 1 of the write once disc DSC (hereafter referred to as the first side), the entire surface of the recording and reproducing surface is made up of a program area 1a as shown in FIG. 1(a), whereas the other side 2 (hereafter referred to as the second side) comprises a ring shaped label area 2b and a ring shaped program area 2a provided on the inside of the label area 2b, as shown in FIG. 1(b).

Figure 2:
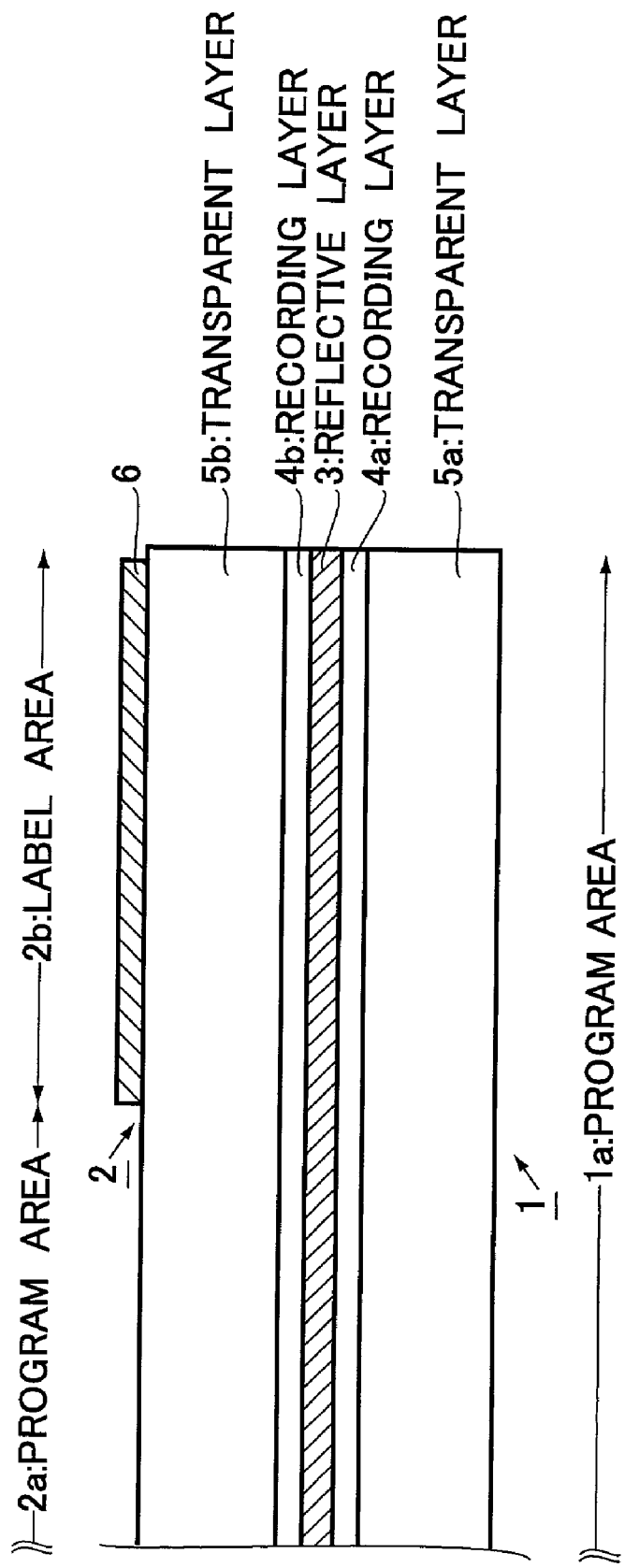
FIG. 2 is a cross-sectional enlarged view showing a construction of the write once disc shown in FIG. 1.

In addition, as is evident from the construction shown in the longitudinal sectional view of FIG. 2, the structures of the first side 1 and the second side 2 are substantially symmetrical about a reflective layer 3 disposed therebetween.

The first side 1 is a layered construction comprising a recording layer 4a made of an organic dye material and a transparent layer 5a made of a polycarbonate. The second side 2 is also a layered construction comprising a recording layer 4b made of an organic dye material and a transparent layer 5b made of a polycarbonate. The recording layer 4b is formed of either a cyanine or an azo based organic dye.

The label area 2b is formed of a thin printed layer 6 provided on the surface of the transparent layer 5b of the second side 2, and text or a design, such as the name "DEFGH Corporation" of the company who manufactured the disc or a trademark "ABC", is printed on this printed layer 6.

In other words, the second side 2 is formed of a label area 2b which has the same function as a conventional label surface, and a program area 2a onto which information can be written optically.

When a light beam which has been modulated by a write signal is irradiated onto the program area 1a of the first side 1, the organic dye of the recording layer 4a heats up and melts causing a chemical change, and the writing of information is performed by the formation of distortions in the vicinity of the interface between the recording layer 4a and the transparent layer 5a. Furthermore, the reading of information is conducted by irradiating a light beam of a predetermined power level onto the program area 1a containing the prerecorded information, and detecting the reflected light from the recording layer 4a.

Similarly, the writing of information to the recording layer 4b is conducted by irradiating a writing light beam onto the program area 2a of the second side 2, and the reading of information can be performed by irradiating a light beam of a predetermined power level onto the program area 2a containing prerecorded information, and detecting the reflected light from the recording layer 4b.

As follows is a description of the use of the write once disc DSC.

The write once disc DSC is manufactured and shipped with nothing recorded in the program areas 1a, 2a. In other words, the disc is shipped as a blank disc.

When a user inserts the write once disc DSC into an audio device provided with an information writing function described below and then performs editing operations, the audio device irradiates a writing light beam onto the recording layer 4b of the program area 2a provided on the second side 2, and forms a visible image pattern such as text or a design on the recording layer 4b. This visible image pattern comprising text or a design or the like is known as pit art.

Figure 3:
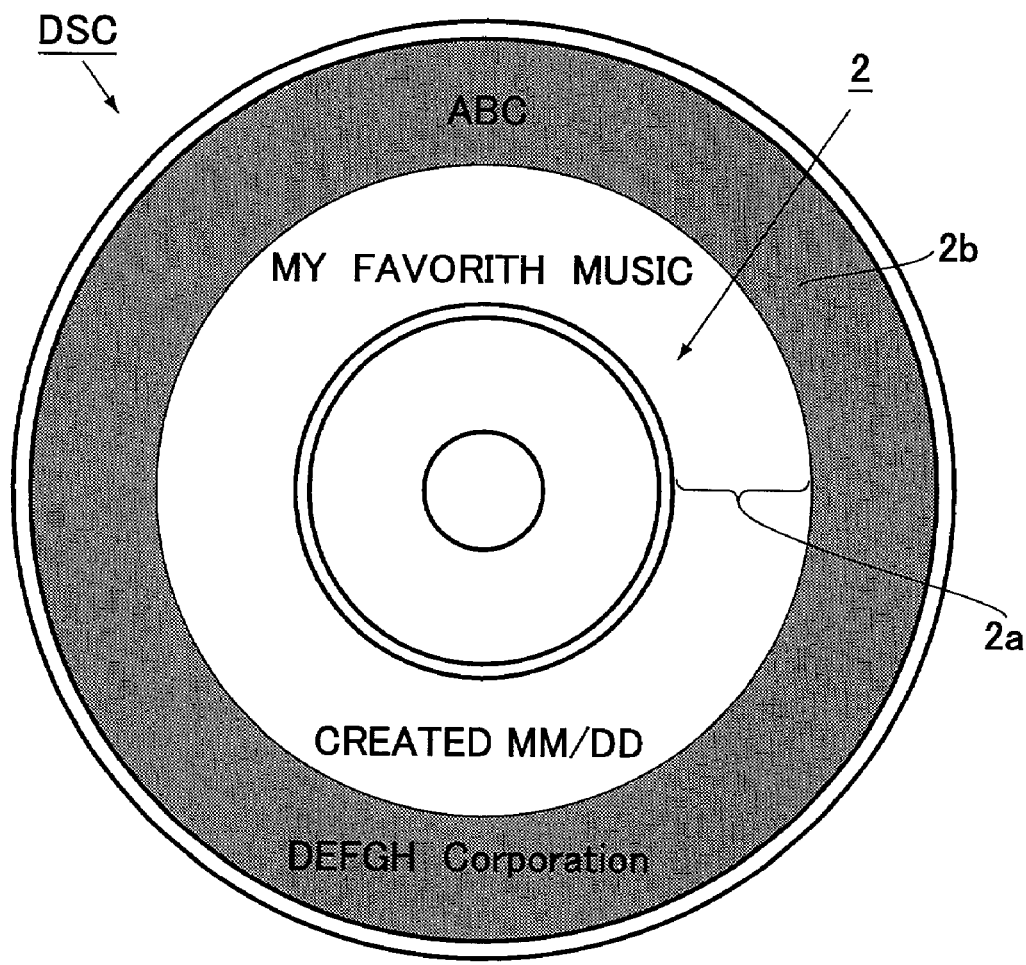
FIG. 3 is an explanatory diagram showing pit art recorded on the write once disc shown in FIG. 1.

For example, if the user inputs text such as "MY FAVORITE MUSIC", "CREATED MM/DD" into the audio device, then as shown in FIG. 3, the input text is written onto the recording layer 4b of the program area 2a as an image pattern.

Then, because the optical characteristics such as the reflectance of those sections of the recording layer 4b in which the image pattern has been written differ from the sections in which no pattern has been written, the user is able to see the image pattern (pit art), and is therefore able to easily organize a disc collection.

In other words, according to a write once disc DSC of this embodiment, by using the first side 1 for the normal writing of information, and using the program area 2a of the second side 2 as a new label surface for the writing of pit art, a disc can be provided which is easy for a user to identify and organize.

Furthermore, because the pit art is written onto the recording layer 4b of the program area 2a, the pit art is protected from external influences by the transparent layer 5b. As a result, there is no danger of the pit art gradually fading in the same manner as conventional handwritten texts or designs, and moreover the problems associated with a loss in aesthetic appearance can also be prevented.

Moreover, in those cases where the user does not write any pit art, the program area 2a of the second side 2 can be used for the normal writing of information, in the same manner as the program area 1a of the first side 1, and so the range of uses can be expanded.

Furthermore, by forming the recording layer 4b of a cyanine or an azo based organic dye, the differences in optical characteristics (particularly the contrast) between the written sections of the pit art and the non-written sections can be magnified, thereby improving the visibility of the pit art.

Variations of the present embodiment will be described with reference to FIG. 4 through FIG. 8. In FIG. 4 to FIG. 8, those components which are the same as, or correspond to, components in FIG. 1 to FIG. 3, are labeled with the same reference symbol.

Figure 4:
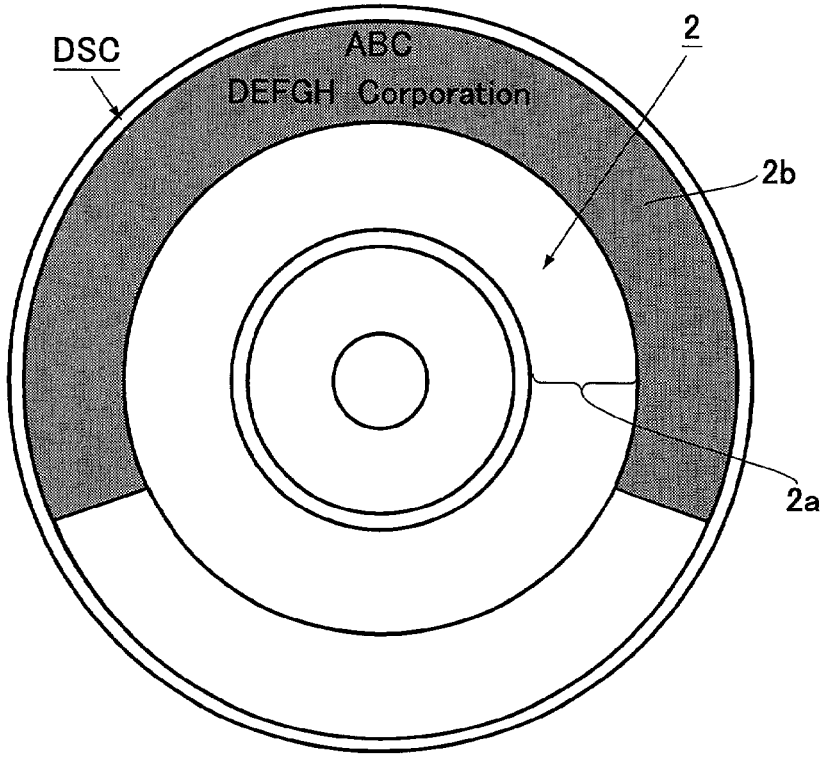
FIG. 4 is a plan view showing the construction of a first variation of the write once disc.

FIG. 4 is a plan view showing the configuration of a second side 2 of a first variation. In other words, in a write once disc DSC of this first variation, a first side 1 comprises a recording and reproducing surface in which the entire surface thereof functions as a program area 1a, in the same manner as FIG. 1(a), whereas a second side 2, on the other side of the disc, has the configuration shown in FIG. 4.

Whereas the label area 2b shown in FIG. 1 is formed in a ring shape, the label area 2b of this first variation is formed in a curved arc shape. The name or trademark or the like of the company who manufactured the disc is printed in this curved label area 2b, and moreover pit art can be written onto the program area 2a provided on the inside of this label area 2b.

In this manner, the shape of the label area 2b need not be the ring shape shown in FIG. 1(b), and provided that the shape does not interfere with the writing of pit art to the program area 2a or the normal writing of information, then any shape is possible.

Figure 5:
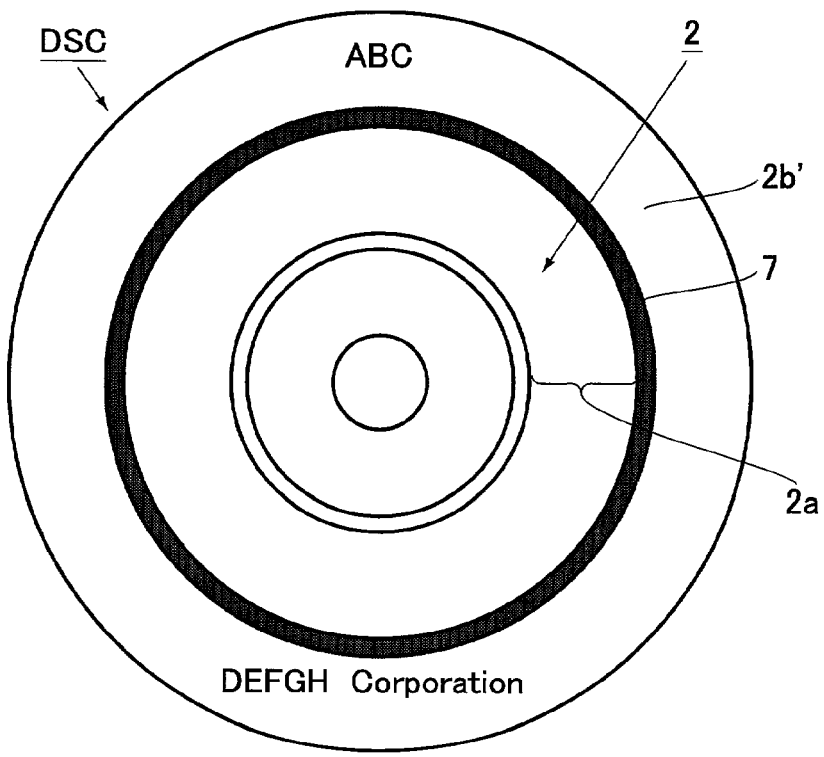
FIG. 5 is a plan view showing the construction of a second variation of the write once disc.

FIG. 5 is a plan view showing the configuration of a second side 2 of a second variation. In other words, in a write once disc DSC of this second variation, a first side 1 comprises a recording and reproducing surface in which the entire surface thereof functions as a program area 1a, in the same manner as FIG. 1, whereas a second side 2, on the other side of the disc, has the configuration shown in FIG. 5.

Whereas the label area 2b shown in FIG. 1 and FIG. 4 is formed from an opaque sheet 6 or printing provided thereon as shown in the longitudinal sectional view of FIG. 2, in a write once disc DSC of this second variation, a printed layer 6 is not provided.

Consequently, the recording layer 4b of the second side 2 is exposed through the transparent layer 5b, in the same manner as the recording layer 4a of the first side 1 is covered with the transparent layer 5a.

As shown in FIG. 5, a visible, but comparatively narrow ring shaped area of pit art 7 has been formed in advance. Then, the name or trademark or the like of the company who manufactured the disc is prerecorded as pit art onto the section of the recording layer 4b on the outside of the pit art 7 in a radial direction, whereas the section of the recording layer 4b on the inside of the pit art 7 in a radial direction functions in the same manner as the program area 2a shown in FIG. 1(b) and FIG. 2.

According to a write once disc DSC of the above construction, a bibliographic description such as the name or trademark or the like of the company who manufactured the disc is readily visible, and so the area 2b' on the outside of the pit art 7 in a radial direction can be used as a label area.

Furthermore, by forming the ring shaped pit art 7 in advance, the aforementioned label area 2b' and the program area 2a can be readily identified.

Moreover, in those cases where special data such as address data or the like comprising information such as the location of the pit art 7 is prerecorded as part of the ring shaped pit art 7, and a CD player or a DVD player or the like is used to read this special data, the player can be controlled so that the pickup is not moved to any position outside of the pit art 7 in a radial direction. By so doing, the problem where the pickup is mistakenly moved into the label area 2b', for example when a user temporarily carries out normal information writing to the program area 2a of the second side 2 without writing any pit art, or when a user conducts the writing of pit art in the program area 2a, can be effectively prevented.

Figure 6:
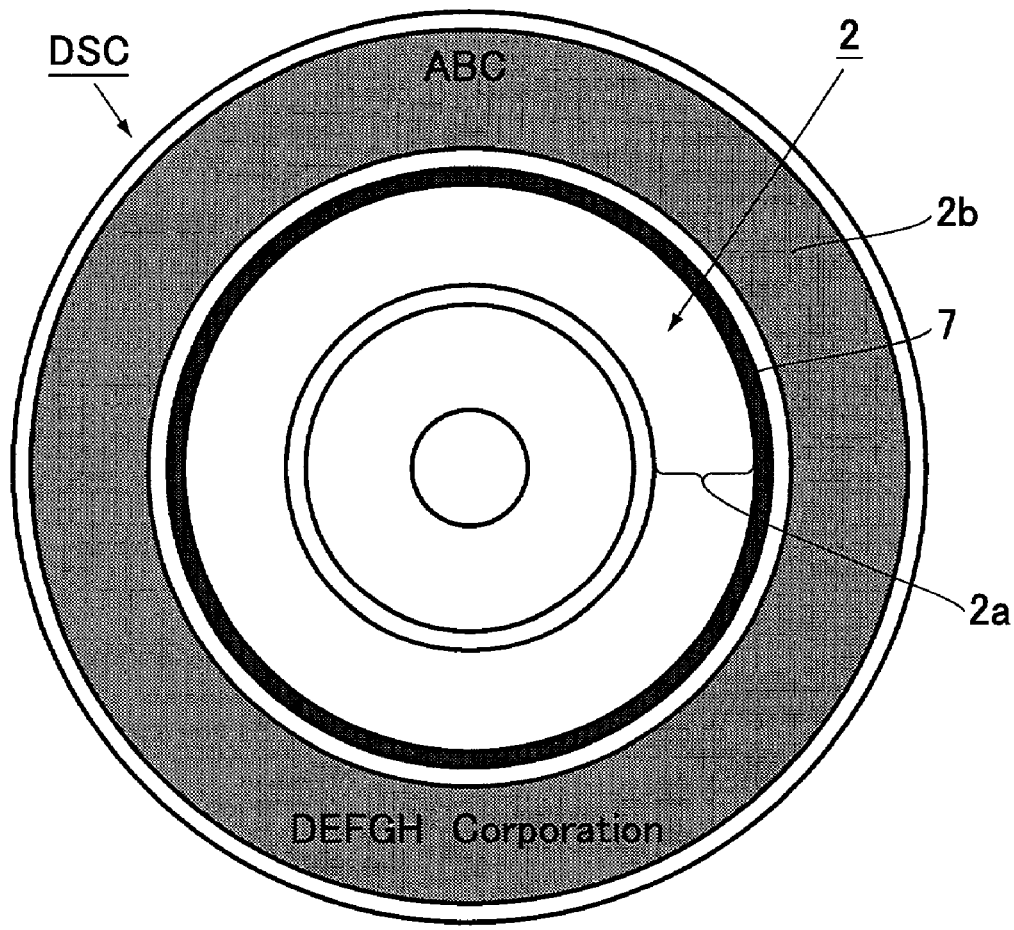
FIG. 6 is a plan view showing the construction of a third variation of the write once disc.

FIG. 6 is a plan view showing the configuration of a second side 2 of a third variation. In other words, in a write once disc DSC of this third variation, a first side 1 comprises a recording and reproducing surface in which the entire surface thereof functions as a program area 1a, in the same manner as FIG. 1, whereas a second side 2, on the other side of the disc, has the configuration shown in FIG. 6.

In a write once disc DSC of the third variation, the second side 2 comprises a label area 2b formed by the provision of a printed layer 6, and a narrow ring shaped pit art 7 formed in advance on the inside of the label area 2b, and the area inside of the pit art 7 in a radial direction functions as a program area 2a.

According to a disc of the above construction, a bibliographic description such as the name or trademark or the like of the company who manufactured the disc is prewritten in the label area 2b, and the program area 2a can be used as an area for the user to write pit art. Furthermore, by including address data or the like described above in the recording of the ring shaped pit art 7, a CD player or DVD player or the like can be controlled so that the pickup is not mistakenly moved inside the label area 2b.

FIGS. 7(a) and 7(b) are plan views showing a fourth variation, where FIG. 7(a) shows the configuration of a first side 1, and FIG. 7(b) shows the configuration of a second side 2.

Figure 7:
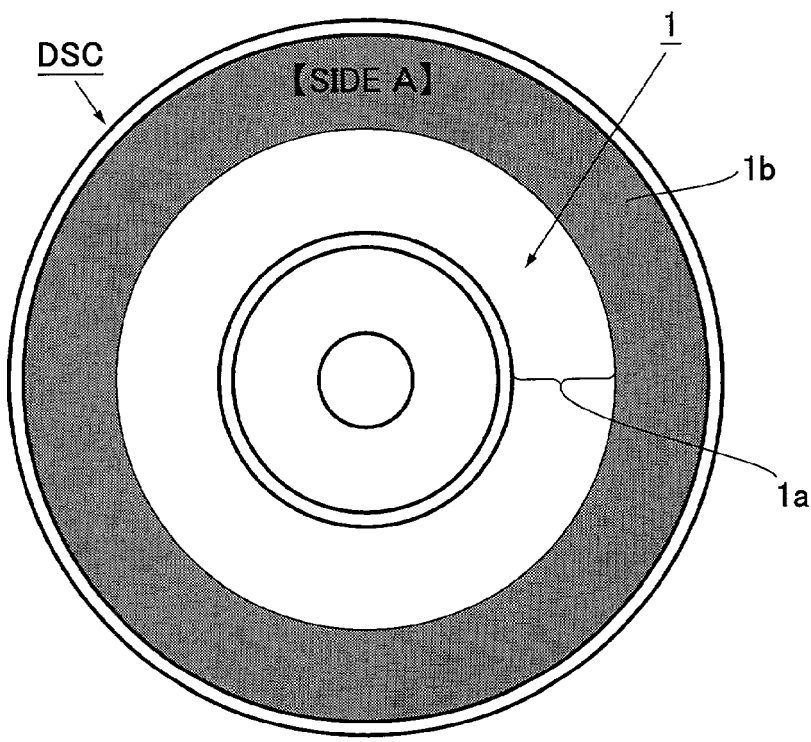
FIGS. 7(a) and 7(b) are plan views showing the construction of a fourth variation of the write once disc.
Figure 7:
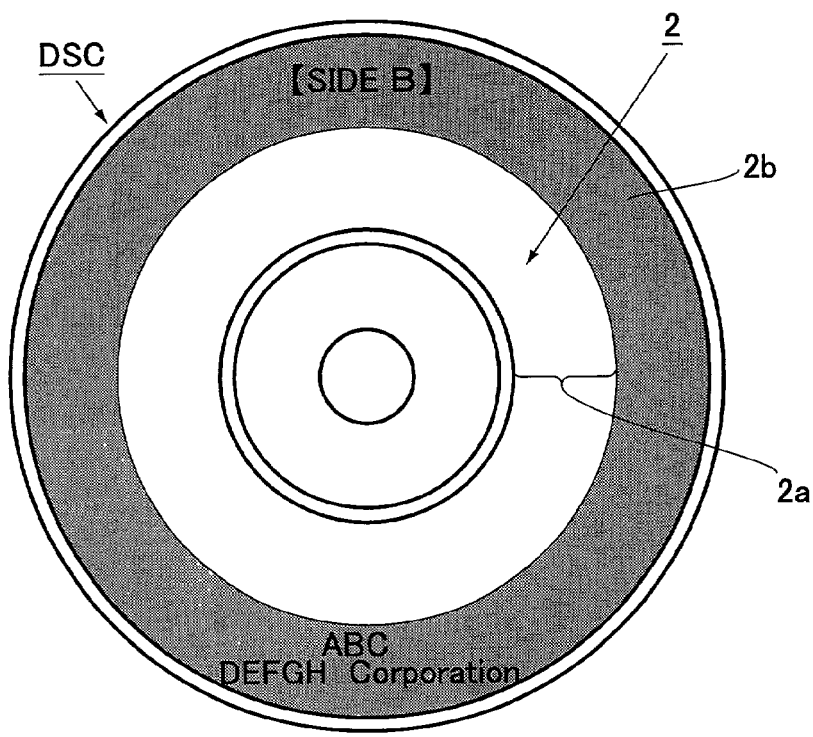

In terms of details, in the write once discs DSC shown in FIG. 1 to FIG. 6, mainly, the surface provided for the normal writing of information was the first side 1 and the surface for writing pit art was the second side 2, but in the fourth variation shown in FIG. 7, the disc is configured so that the user can select whether to write pit art onto either the first side 1 or the second side 2, or alternatively to carry out normal writing of information to both the first side 1 and the second side 2. As a result, the user is able to use a write once disc DSC of this fourth variation without having to distinguish between the two sides as is required in the write once discs DSC shown in FIG. 1 to FIG. 6.

In FIG. 7(a), the first side 1 of the write once disc DSC comprises a ring shaped label area 1b and a program area 1a provided on the inside of the label area 1b in a radial direction. Identifying text or designs, for example "Side A" are preprinted on the label area 1b.

In contrast, as shown in FIG. 7(b), the second side 2 comprises a ring shaped label area 2b and a program area 2a provided on the inside of the label area 2b in a radial direction. Furthermore, the name or trademark or the like of the company who manufactured the disc, as well as text or a design, for example "Side B", for identifying the side as opposite to the aforementioned "Side A" is preprinted in the label area 2b.

Figure 8:
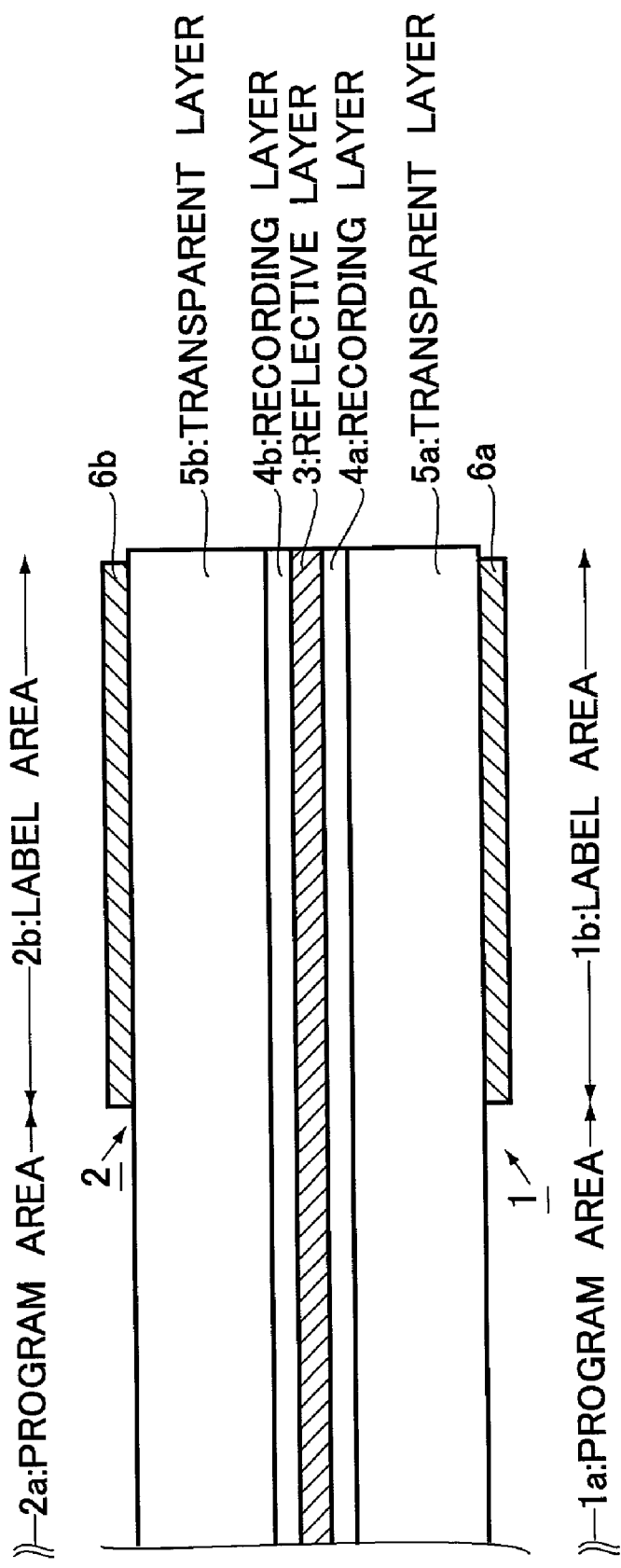
FIG. 8 is a cross-sectional enlarged view showing a construction of the write once disc of the fourth variation.

In addition, as is evident from the longitudinal sectional view of FIG. 8, the label area 1b is formed by forming a printed layer 6a on the surface of the transparent layer 5a of the first side 1 (namely, side A). Similarly, the label area 2b is formed by forming a printed layer 6b on the surface of the transparent layer 5b of the second side 2 (namely, side B).

When a user inserts a write once disc DSC of this type of construction into an audio device provided with an information writing function described below and then performs editing operations, the audio device irradiates a writing light beam onto the recording layer (4a or 4b) of the program area (1a or 2a) provided on the side of the disc facing the pickup (either side A or side B), and forms a visible pit art comprising text or a design or the like.

For example, if the user inputs text such as the aforementioned "MY FAVORITE MUSIC", "CREATED MM/DD" into the audio device, then the input text is written onto the recording layer 4a or 4b as an image pattern.

Then, in the case where pit art is written onto the recording layer 4a (or 4b), normal information writing can be carried out on the other recording layer 4b (or 4a).

In this manner, according to this fourth variation, there are substantially no differences between the first side 1 and the opposing second side 2, and so this construction offers the flexibility of enabling the user to choose either side.

With this fourth variation, in order to enable the user to use either side without the need to distinguish one from the other, it is preferable that both recording layers 4a and 4b are formed from a cyanine or an azo based organic dye, thereby enabling the formation of pit art of good visibility.

However, constructions are also possible in which one of the recording layers 4a, 4b is formed from a cyanine or an azo based organic dye, and the other recording layer is formed of another type of organic dye.

Furthermore, when a so-called blank disc is manufactured and shipped, the first side 1 may be designated in advance as a side for normal information recording, with the second side 2 and the label area 2b provided thereon designated for the recording of pit art. In such a case, it is preferable that the first side 1 and the second side 2 are produced so as to be visually distinguishable, by forming the recording layer 4b on the second side 2 from a cyanine or an azo based organic dye, to enable highly visible pit art to be recorded, and forming the recording layer 4a on the first side 1 from an organic dye which is neither cyanine nor an azo based.

For example, it is preferable that even in the case of a blank disc, the first side 1 and the second side 2 are formed using organic dyes which can be visibly distinguished. In such cases, at least the recording layer 4b on the second side 2 should be formed of an organic dye which will yield readily visible pit art on recording of such pit art. In contrast, the recording layer 4a on the other side, namely the first side 1, may be formed of an organic dye for which the sections with pits recorded thereon cannot be identified from the unrecorded sections, or alternatively may be formed of an organic dye for which visual identification may be possible, but in which the difference in optical characteristics such as the reflectance between the sections with pits recorded thereon and the unrecorded sections, is smaller than that for the pit art recorded on the recording layer 4b of the second side 2.

In summary, it is preferable that, as a prerequisite condition, the recording layer 4b of the second side 2 is formed of an organic dye which enables the formation of highly visible pit art.

A plurality of variations of the embodiment of the present invention have been described above, although other constructions comprising suitable combinations of the above variations are also possible.

For example, in the program areas 1a, 2a of the two sides 1, 2 respectively shown in FIG. 7(a) and FIG. 7(b), pit art similar to the ring shaped pit art 7 shown in FIG. 6, could be prewritten onto at least one of the first side 1 or the second side 2.

Furthermore, at least one of the label areas 1b, 2b of the two sides 1, 2 respectively shown in FIG. 7(a) and FIG. 7(b) could also be formed using the construction shown in FIG. 5.

Furthermore, the configurations shown in FIG. 4, FIG. 5 and FIG. 6 could also be selectively combined to form a new configuration.

Moreover, the description above focused on an embodiment of a CD-R in which information can be written to both sides, but the present invention can also be applied to write once DVD discs in which information can be written to both sides, re-writable CD-RW discs in which rewriting is possible on both sides, and re-writable DVD discs (such as DVD-RW, DVD+RW and DVD-RAM discs) in which rewriting is possible on both sides, as well as other types of media in which information recording is possible.

Next, an audio device 11 provided with a pit art writing function will be described with reference to FIG. 9 to FIG. 13. The audio device 11 has functions for reproducing not only the aforementioned write once discs DSC, but also music CD discs, CD-ROMs and CD-Extra discs, and is also capable of reproducing from discs such as DVD-ROM and DVD-Video discs.

Figure 9:
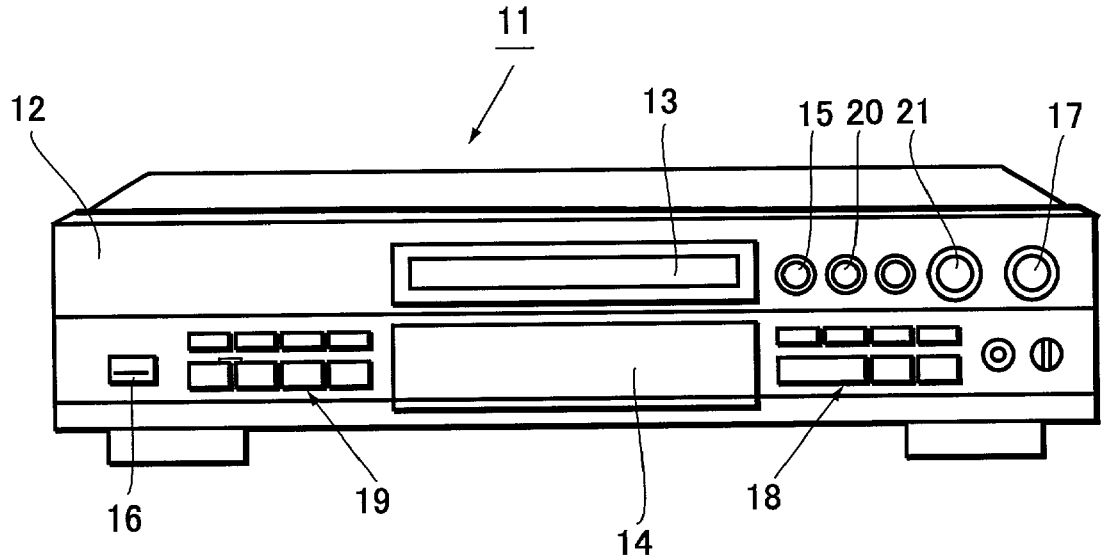
FIG. 9 is a diagram showing the external construction of an audio device.

As shown in FIG. 9, a front panel 12 of the audio device 11 is provided with a disc insertion slot 13 for loading and unloading the aforementioned types of disc and a display section 14 formed from a liquid crystal display or the like. A plurality of operational switches are provided near the disc insertion slot 13 and the display section 14.

Examples of typical operational switches include an eject switch 15 for carrying out the aforementioned loading and unloading operations, a power switch 16, a rotary switch 17 for adjusting the sound volume, a plurality of function switches 18 positioned to the right of the display section 14, a plurality of function switches 19 positioned to the left of the display section 14, a recording start switch 20 for sending an instruction to start recording, and a rotary switch 21 known as a jog dial.

The plurality of function switches 18 comprises a plurality of operational switches for conducting operations such as starting the reproducing of data recorded on a disc, pausing the reproducing of data, or specifying a track number of the recorded data.

The plurality of function switches 19 comprises a plurality of operational switches for conducting operations for the writing of pit art onto a write once disc or a re-writable disc. Specific examples include a pit art writing start switch for sending an instruction to start writing of the pit art, as well as a plurality of editing switches for editing the size of text, symbols or designs or the like to be written as pit art, and the layout thereof, and a settlement switch for settling the edited text, symbols or designs.

The rotary switch 21 known as a jog dial is provided so that the user can select the desired text, symbols or design or the like for writing as pit art. Each time the user rotates the rotary switch 21 by a predetermined angle, the text, symbol or design or the like changes, and subsequent operation of the aforementioned settlement switch causes the selected text, symbol, or design or the like to be settled as pit art.

Furthermore, although not shown in FIG. 9, on the back face of the audio device 11 are provided an external device connection terminal for connecting an external device such as a CS tuner, a BS tuner, a CD player, an MD player, or a DVD player, and a keyboard connection terminal for connecting a keyboard.

Next, a description of the internal configuration of the audio device 11 will be made with reference to FIG. 10.

Figure 10:
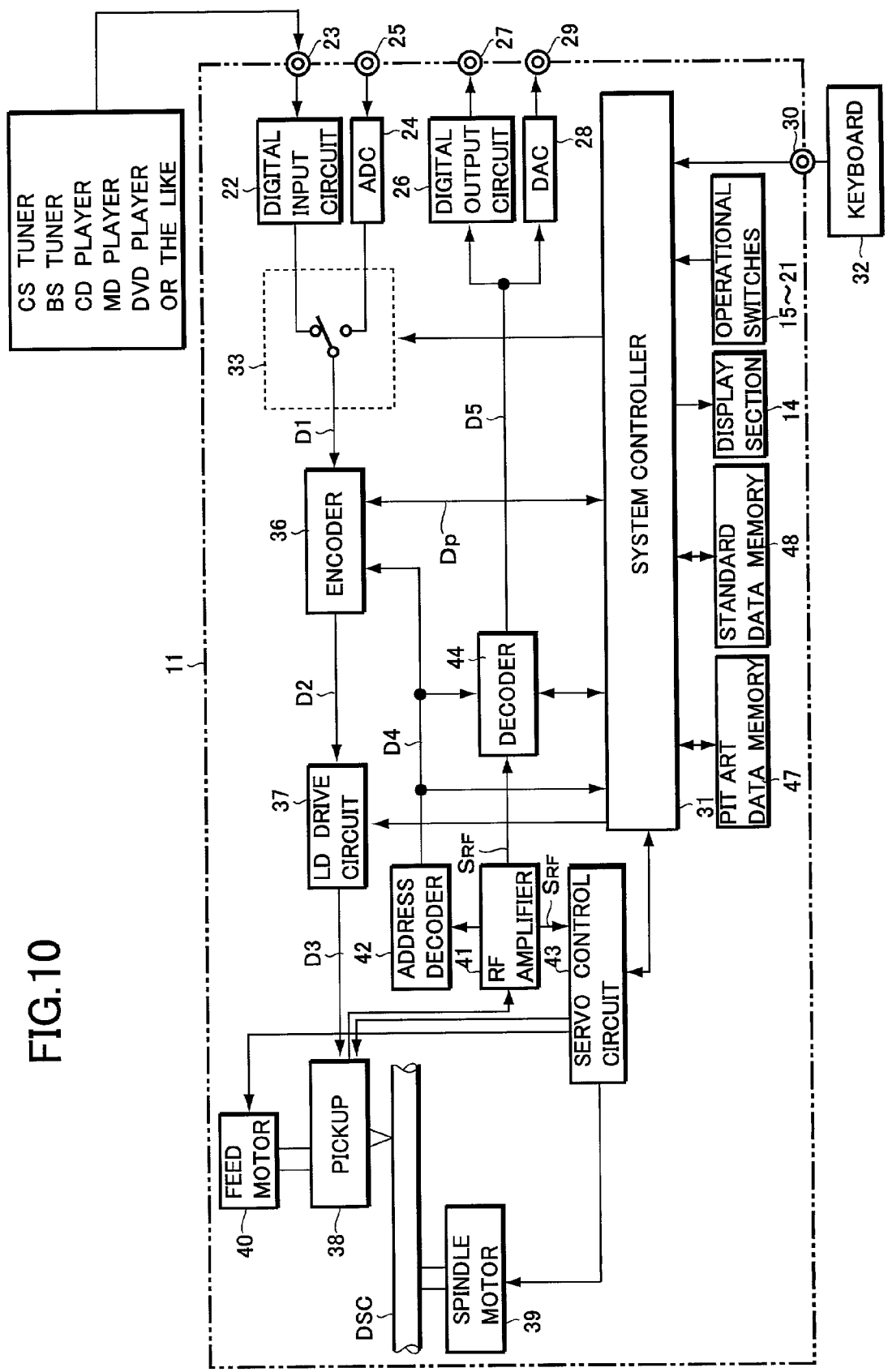
FIG. 10 is a block diagram showing the internal configuration of the audio device.

In FIG. 10 is provided a digital input terminal 23 connected to a digital input circuit 22, an analog input terminal 25 connected to an A/D converter 24, a digital output terminal 27 connected to a digital output circuit 26, and an analog output terminal 29 connected to a D/A converter 28.

The digital input terminal 23 is formed from an optical digital input terminal or a coaxial digital input terminal, and the digital input circuit 22 converts the optical or electrical digital data supplied via the digital input terminal 23 to digital data which can undergo signal processing, and then inputs this data.

Consequently, if an external device such as a CS tuner, a BS tuner, a CD player, or an MD player or the like is connected to the digital input terminal 23, the digital data supplied from the external device is input into the audio device 11 as unchanged digital data.

The analog input terminal 25 is provided for inputting analog signals. In other words, if an external device such as a CD player or an MD player is connected to the analog input terminal 25, and an audio signal which has undergone analog reproducing by the external device is supplied, then the A/D converter 24 converts the analog audio signal to digital data which is then input into the audio device 11.

The digital output terminal 27 is formed from an optical digital output terminal or a coaxial digital output terminal. Furthermore, the digital output circuit 26 converts the reproduced digital data obtained when the audio device 11 is used to reproduce a write once disc or a re-writable disc or a dedicated reproducing only disc, to either optical or electrical digital data, and then outputs this digital data to an external device via the digital output terminal 27.

The D/A converter 28 converts digital data reproduced from a write once disc, a re-writable disc or a dedicated reproducing only disc to an analog signal, and outputs the analog signal externally via the analog output terminal 29. Consequently, if an analog amplifier with a connected speaker is connected to the analog output terminal 29, then the reproduced sound can be played through the speaker.

The aforementioned keyboard connection terminal 30 is connected to a system controller 31 provided with a microprocessor (MPU). If the user connects a keyboard 32 which complies with a standard such as the JIS standard to the keyboard connection terminal 30, then keyboard operations can be used for editing pit art data and issuing instructions for the writing of the pit art, instead of the aforementioned function switches 19 and the rotary switch 21.

An encoder 36 and an LD drive circuit 37 are connected subordinately to the digital input circuit 22 and the A/D converter 24 via a two contact switching circuit 33, the switching of which is controlled by the system controller 31.

The encoder 36 is controlled by the system controller 31, and performs EFM (Eight-Fourteen Modulation) and CIRC (Cross Interleave Reed-Solomon code) interleaving on the data D1 input from the two contact switching circuit 33, and then outputs writing data D2 generated as a result of the processing to the LD drive circuit 37.

Furthermore, when pit art data Dp is supplied from the system controller 31, the encoder 36 generates writing data D2 based on this pit art data Dp, and outputs the writing data D2 to the LD drive circuit 37, although the details of this process will be described below.

The LD drive circuit 37 is controlled by the system controller 31, and performs power amplification of the writing data D2 from the encoder 36, and then supplies the amplified data to a semiconductor laser (not shown in the figure) provided inside a pickup 38. Light which has been modulated using this power amplified writing data D3 (hereafter referred to as the writing light) is then irradiated onto the recording layer of the disc to realize the writing of the data.

Furthermore, when data is read from a disc, the LD drive circuit 37 supplies a constant level of power, specified by the system controller 31, to the semiconductor laser inside the pickup 38, thereby causing light of a constant power level (hereafter referred to as the reading light) to be irradiated onto the recording layer of the disc.

The audio device 11 is also provided with a spindle motor 39 for rotating a clamped disc at a constant linear velocity, and a feed motor 40 for moving the pickup 38 back and forth across the disc in a radial direction.

In addition, a light detector (not shown in the figure) converts the reflected light, generated in accordance with the irradiation of either a writing light or a reading light onto the disc during the reading of data or the writing of data respectively, into an electrical signal, and an RF amplifier 41 supplies this photoelectrically converted signal $S_{RF}$ to an address decoder 42, a servo control circuit 43 and a decoder 44.

The address decoder 42 detects a track address of the disc being irradiated with the writing light or reading light based on the photoelectrically converted signal $S_{RF}$ output by the RF amplifier 41, and supplies the detected address data D4 to the encoder 36 and the system controller 31.

As a result, when the aforementioned writing is to be performed, the encoder 36 transfers the aforementioned writing data D2 synchronized with the address data D4 to the LD drive circuit 37, and the system controller 31 determines whether or not at the time of writing the pickup 38 is on track relative to the track address which is to be recorded on the disc.

The decoder 44 receives input of the photoelectrically converted signal $S_{RF}$ output by the RF amplifier 41 and the address data D4 output from the address decoder 42, and performs EFM demodulation and deinterleaving of the audio data or the like incorporated in the photoelectrically converted signal $S_{RF}$, in synchronization with the address data D4. As a result, decoding processing opposite to the encoding of the encoder 36 is performed, and the decoded data D5 generated as a result of the decoding processing is supplied to the digital output circuit 26 and the D/A converter 28.

The servo control circuit 43 detects tracking error and focus error based on the photoelectrically converted signal $S_{RF}$ output from the RF amplifier 41, and then performs servo control of the spindle motor 39, the feed motor 40 and the pickup 38 based on the detection results.

Figure 11:
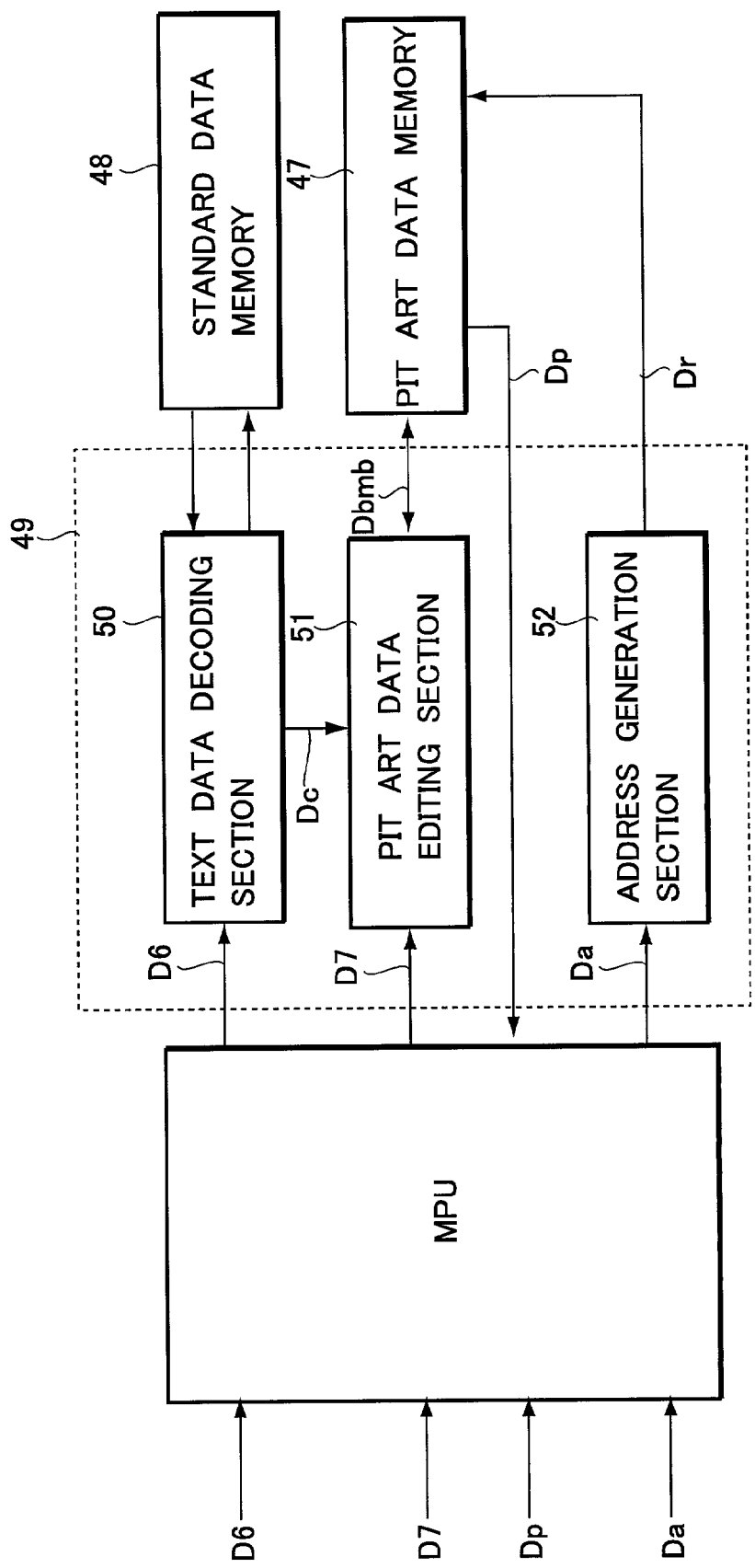
FIG. 11 is a block diagram showing the configuration of a pit art data generation section provided in the audio device.

In addition, the system controller 31 is also connected to a pit art data memory 47 and a standard data memory 48, and is also provided with a pit art data generation section 49 shown in FIG. 11.

The pit art data generation section 49 comprises a text data decoding section 50, a pit art data editing section 51 and an address generation section 52, and generates pit art data Dp under control of the microprocessor MPU provided in the system controller 31.

The text data decoding section 50 receives input of text information data from the rotary switch 21 known as a jog dial, and text information data from the keyboard 32 via the microprocessor MPU, and then based on this input text information data D6, retrieves standard text data Dc which has been prerecorded in the standard data memory 48, and supplies this text data Dc to the pit art data editing section 51.

The pit art data editing section 51 converts the standard text data Dc to data in bit map format (hereafter referred to as bit map data) Dbmp, and then stores this bit map data Dbmp in the pit art data memory 47. Furthermore, when the user operates the function switches 19 or the keyboard 32 to perform editing, then the pit art data editing section 51 receives data D7 corresponding with the editing instructions via the microprocessor MPU, and edits the bit map data Dbmp in accordance with the editing instructions, before storing the edited data in the pit art data memory 47.

The address generation section 52 generates address data Dr for reading the bit map data Dbmp stored in the pit art data memory 47. In other words, based on the address data D4 supplied from the address decoder 42 via the microprocessor MPU, the address generation section 52 first determines the position of the pickup 38 relative to the disc. Then, when the judgement is made that the pickup 38 has reached the location at which the pit art is to be written, the pit art data memory 47 is accessed using the address data Dr, and the bit map data Dbmp is supplied to the encoder 36 via the microprocessor MPU as a series of single dot pit art data Dp, and this data Dp is used to write the pit art.

As follows will be a description of a pit art writing operation using the audio device 11 of the construction described above with reference to the flowchart of FIG. 12. As a typical example, the description will be made on the case where pit art is formed on the CD-R disc shown in FIG. 1.

Figure 12:
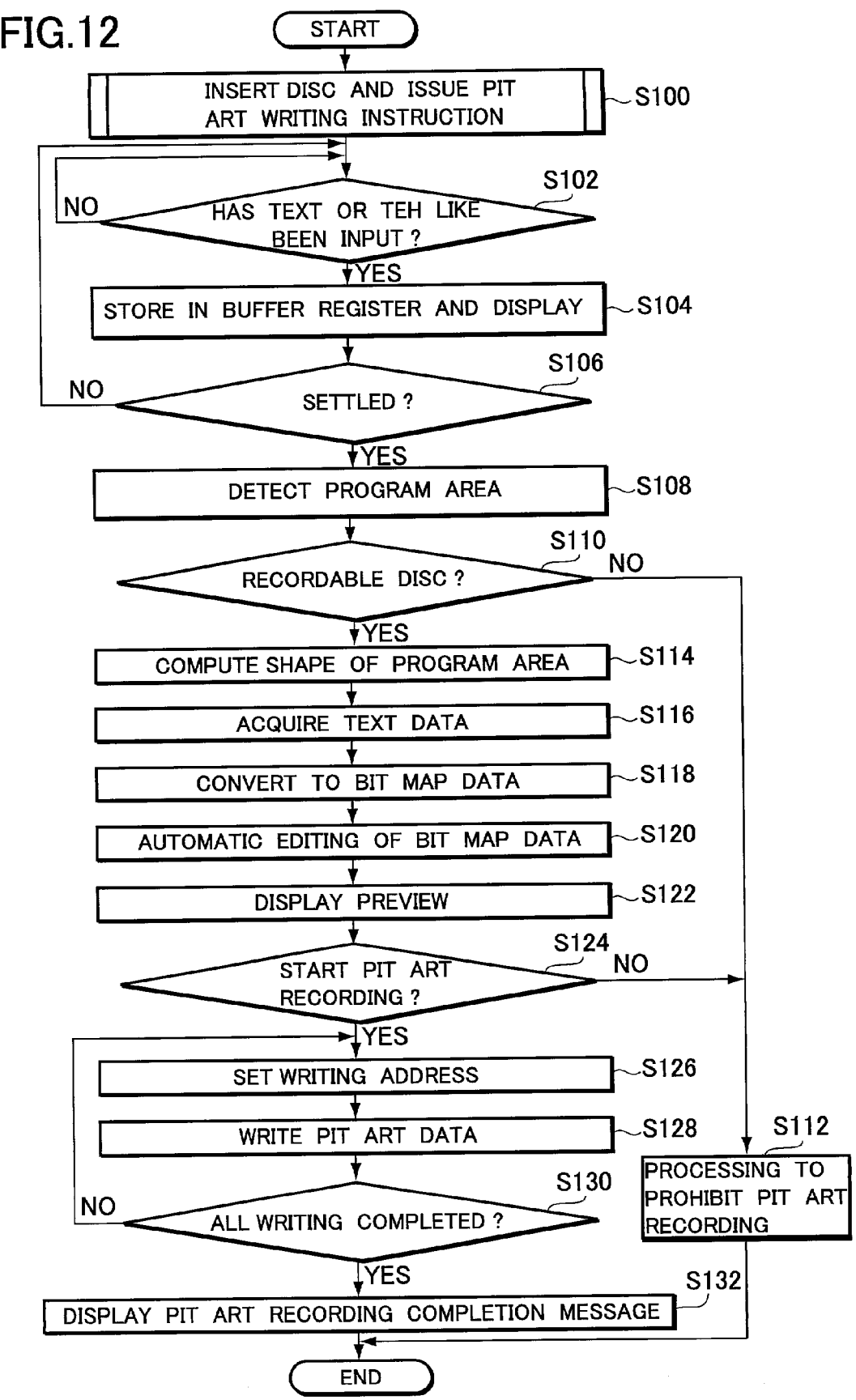
FIG. 12 is a flowchart describing the operations when pit art writing is performed with the audio device.

In FIG. 12, when a user inserts the CD-R disc DSC described above (hereafter referred to as the disc) into the disc insertion slot 13 with the second side 2 facing the pickup 38, and then operates a predetermined operational switch amongst the function switches 19 to issue an instruction to write the pit art (step S100), the process proceeds to step S102.

At step S102, the system controller 31 determines whether text or the like has been input via the aforementioned rotary switch 21 known as a jog dial or the keyboard 32. At the subsequent step S104, if text or the like has been input, the input text data is stored in a buffer register (not shown in the figures) inside the system controller 31, and the display section 14 flashes the text or the like on and off. Subsequently, when the user performs the settlement operation at step S106, the text data or the like inside the buffer register is settled, and the aforementioned flashing display switches to a still screen display (a non-flashing display) informing the user that the input text or the like has been settled.

Figure 13:
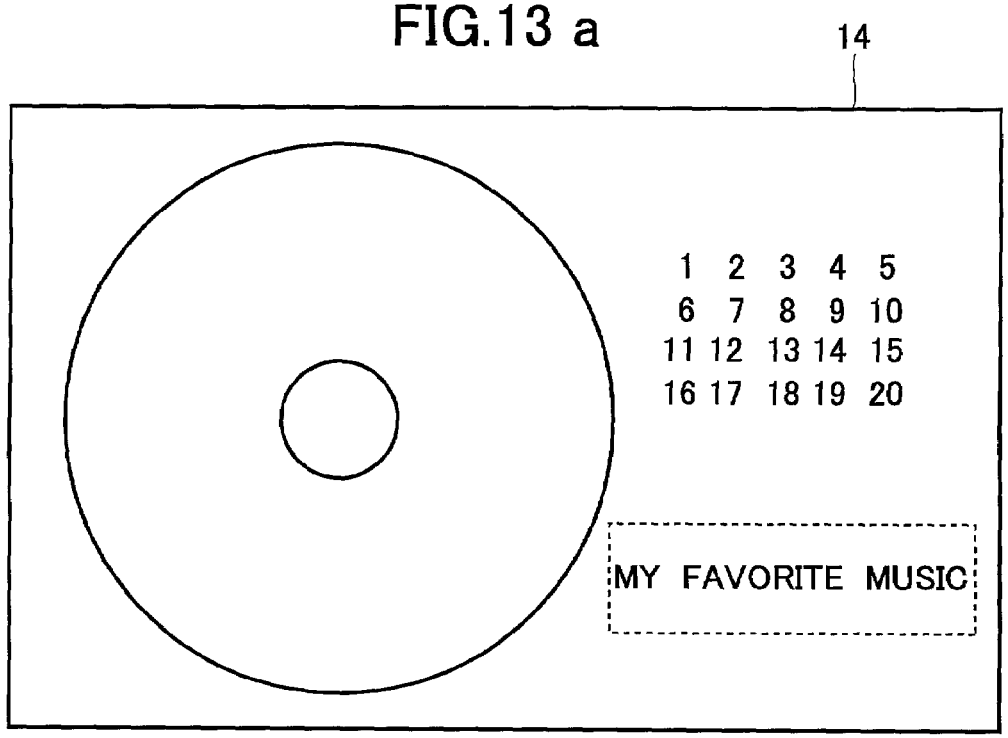
FIG. 13 is an explanatory diagram showing an example of a preview display.
Figure 13:
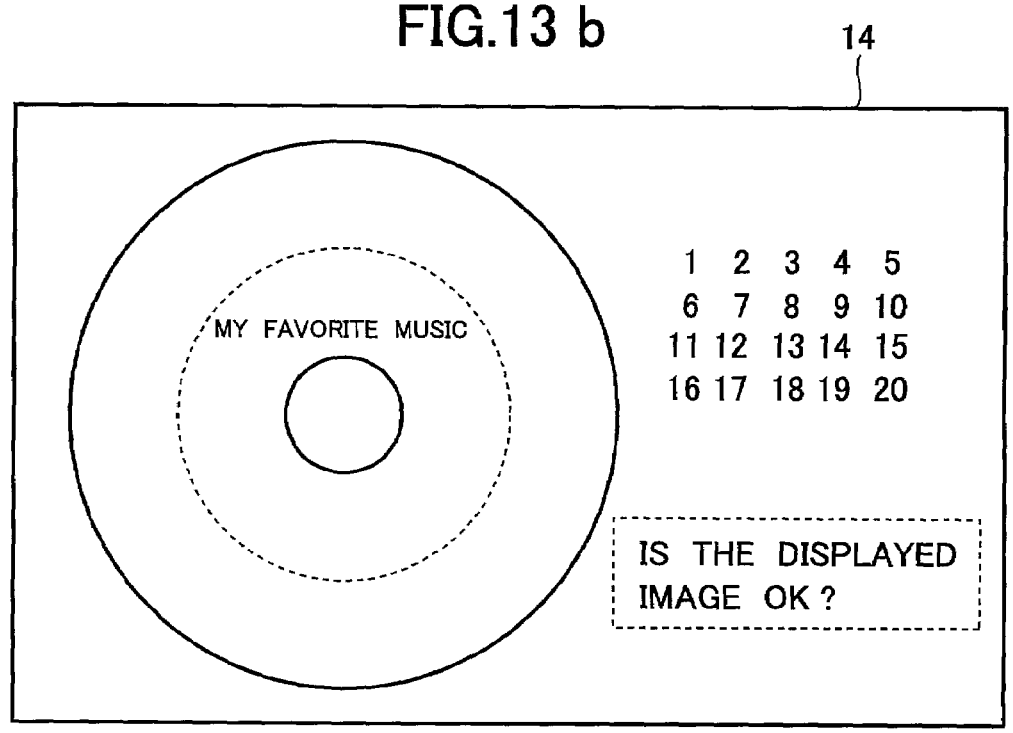

More specifically, if the user rotates the rotary switch 21 by a suitable amount, or operates the keyboard 32, and inputs the text string "MY FAVORITE MUSIC", then the data for this text string is stored in the aforementioned buffer memory. The text string is also flashed on and off on the display section 14, as shown in FIG. 13(*a*). Then, when the user operates a predetermined operational switch from amongst the function switches 19 and issues an instruction for final settlement of the text string as the pit art, the data stored in the buffer memory is settled and the flashing text string switches to a still screen display, and the process then proceeds to step S108.

At step S108, the pickup 38 is moved across the write once disc DSC in a radial direction and the program area 2*a* is detected optically. Then, at step S110, based on the results of the optical detection, a judgement is made as to whether or not a recordable disc has been inserted.

At this point, in the case where a dedicated reproducing only disc such as a CD-ROM has been inserted, processing for prohibiting recording (step S112) is activated, such as the displaying of a "recording impossible" message on the display section 14, and the pit art writing process is forcibly quit. In contrast, if the disc is a write once disc DSC, the judgement is made that a recordable disc has been inserted, and the process proceeds to step S114.

At step S114, the start track (hereafter referred to as the start address) ADRS and the end track (hereafter referred to as the end address) ADRE of the program area 2*a* optically detected at step S108 are detected, and this address data ADRS, ADRE is supplied, together with the data D7 comprising the editing instructions, to the pit art data editing section 51 shown in FIG. 11. In addition, the pit art data editing section 51 computes the shape of the program area 2*a* based on the address data ADRS, ADRE. In other words, the pit art data editing section 51 calculates the width of the program area 2*a* in a radial direction, and then computes a ring shape corresponding with the calculated width.

Next, at step S116, the data such as the text string or the like (the text string data selected by the user) D6 stored in the aforementioned buffer register is supplied to the text data decoding section 50 shown in FIG. 11.

At the next step S118, the text data decoding section 50 retrieves the standard text data Dc corresponding to the data D6, and supplies this text data Dc to the pit art data editing section 51. The pit art data editing section 51 then converts the standard text data Dc to bit map data Dbmp.

Next, at step S120, the pit art data editing section 51 compares the size of the bit map data Dbmp with the shape of the program area 2*a*, and then edits the resolution (the density of dots per unit of area) and the size of the bit map data Dbmp so that the pit art will not extend outside the program area 2*a*. The edited bit map data Dbmp is then stored in the pit art data memory 47.

At the next step S122, the bit map data Dbmp stored in the pit art data memory 47 is supplied through the microprocessor MPU to the display section 14, which displays a preview of the manner in which the pit art is to be formed on the program area 2*a* of the write once disc DSC.

For example, if the aforementioned data D6 is the text string "MY FAVORITE MUSIC", then the shape of the write once disc DSC and the shape of the program area 2*a* are displayed, and the edited bit map data Dbmp of the text string "MY FAVORITE MUSIC" is displayed inside the displayed program area 2*a*, as shown in FIG. 13(*b*). Furthermore, a message such as "Is the displayed image OK?" is also displayed, prompting the user to issue an instruction as to whether or not pit art writing should be started based on the displayed bit map data Dbmp.

Consequently, the user is able to preview, in advance, the size and position of the text "MY FAVORITE MUSIC" which is to be written as pit art.

Next at step S124, when based on this preview display, an instruction to start pit art writing is input via the function switches 19 or the keyboard 32, the process proceeds to step S126. In contrast, if an instruction to not proceed with the pit art recording is input via the function switches 19 or the keyboard 32, then the process proceeds to step S112, and the pit art writing process ends.

At the next step S126, the pickup 38 is positioned at the start address ADRS in the program area 2*a*.

Then, at step S128, the first dot worth of data from the bit map data Dbmp is read from the pit art data memory 47, and is then supplied to the pickup 38 as the pit art data Dp and written into the program area 2*a*.

Next, at step S130, a determination is made as to whether or not all of the bit map data Dbmp has been written into the program area 2*a*. If all the data has not yet been written, the process returns to step S126 and the next dot worth of data from the bit map data Dbmp is supplied to the pickup 38 as the pit art data Dp, and is subsequently written into the next address of the program area 2*a* (step S128).

Then when the writing of all of the bit map data Dbmp has been completed, a message indicating the completion of the pit art writing is displayed on the display section 14 at step S132, and the pit art writing process then ends.

When pit art writing has been performed in this manner, pit art is formed in the program area 2*a*, such as the example shown in FIG. 3.

In this manner, by using the audio device 11, a user can write any desired pit art, thereby enabling the disc to be readily identified and organized.

The explanation above described the case where pit art writing is performed using an audio device 11 with a pit art writing function, but the present invention is not limited thereto. The same pit art recording function as the aforementioned audio device 11 could also be realized with a computer program.

For example, a recordable CD player or a DVD player or the like could be mounted in a personal computer or the like, a computer program with the pit art recording function described above is installed on the personal computer or the like to write pit art onto a write once disc or a re-writable disc of the present invention inserted in the recordable CD player or DVD player or the like, by using the personal computer or the like to execute the computer program.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A recordable disc, comprising:
   a first recording layer made of first dye material for recording information by irradiating a light beam, and
   a second recording layer made of second dye material for recording a visible image pattern,
   wherein a contrast between a recorded section and an unrecorded section of said second recording layer is larger than a contrast between a recorded section and an unrecorded section of said first recording layer.

2. The recordable disc according to claim 1, further comprising:
   a reflective layer disposed between said first recording layer and said second recording layer.

3. The recordable disc according to claim 1, further comprising:
   a transparent layer provided on said second recording layer; and
   a printed layer provided on said transparent layer.

4. The recordable disc according to claim 1, wherein said second dye material is a cyanine or an azo based organic dye.

5. The recordable disc according to claim 1, wherein said second recording layer can be visibly distinguished from said first recording layer without recording.

6. The recordable disc according to claim 5, wherein said second dye material is a cyanine or an azo based organic dye.

7. A recordable disc, comprising:
   a first recording layer provided on one side of the disc and made of a first dye material for recording information readable by irradiating a light beam, and
   a second recording layer provided on the other side of the disc and made of a second dye material for recording a visible image pattern by irradiating said light beam,
   wherein a difference of reflectance between a section with pits recorded thereon and an unrecorded section of said second recording layer is larger than that of reflectance between a section with pits recorded thereon and an unrecorded section of said first recording layer.

8. The recordable disc according to claim 7, wherein said first recording layer and said second recording layer are substantially symmetrical about a reflective layer disposed therebetween.

9. The recordable disc according to claim 7, wherein a transparent layer is provided on said second recording layer, and a printed layer is provided on said transparent layer.

10. The recordable disc according to claim 7, wherein said second dye material is a cyanine or an azo based organic dye.

11. The recordable disc according to claim 7, wherein said second recording layer can be visibly distinguished from said first recording layer without recording.

12. The recordable disc according to claim 11, wherein said second dye material is a cyanine or an azo based organic dye.

13. A recordable disc, comprising:
    a first recording layer for recording information, said first recording layer being made of a first dye material, and
    a second recording layer for recording a visible image pattern, said second recording layer being made of a second dye material,
    wherein a contrast between a written section and a non-written section of said second recording layer is larger than a contrast between a written section and a non-written section of said first recording layer.

14. The recordable disc according to claim 13, wherein said first recording layer is provided on one side of the disc, and said second recording layer is provided on the other side of the disc.

15. The recordable disc according to claim 13, wherein said first recording layer and said second recording layer are substantially symmetrical about a reflective layer disposed therebetween.

16. The recordable disc according to claim 13, wherein a transparent layer is provided on said second recording layer, and a printed layer is provided on said transparent layer.

17. The recordable disc according to claim 13, wherein said second dye material is a cyanine or an azo based organic dye.

18. The recordable disc according to claim 13, wherein said second recording layer can be visibly distinguished from said first recording layer without recording.

19. The recordable disc according to claim 18, wherein said second dye material is a cyanine or an azo based organic dye.

* * * * *